United States Patent [19]
Hoffman

[11] Patent Number: 5,476,066
[45] Date of Patent: Dec. 19, 1995

[54] SANITARY DOG KENNEL

[76] Inventor: Oneal M. Hoffman, Rte. 2, Box 350, St. Matthews, S.C. 29135-9566

[21] Appl. No.: 257,700

[22] Filed: Jun. 9, 1994

Related U.S. Application Data

[63] Continuation-in-part of Ser. No. 79,017, Jun. 18, 1993, Pat. No. 5,335,617.

[51] Int. Cl.⁶ ................................................. A01K 31/08
[52] U.S. Cl. .................................................. 119/19; 119/28
[58] Field of Search .......................... 119/15, 17, 19, 119/28

[56] References Cited

U.S. PATENT DOCUMENTS

| | | | |
|---|---|---|---|
| 2,665,664 | 1/1954 | Benjamin | 119/28 |
| 3,097,625 | 7/1963 | Sievers | 119/15 |
| 3,177,848 | 3/1962 | Rubricius | 119/17 |
| 3,292,582 | 12/1966 | Rubricius | 119/15 |
| 3,550,558 | 12/1970 | Sachs | 119/15 |
| 3,731,657 | 5/1973 | Alessio | 119/17 |
| 3,749,061 | 7/1973 | Connelly | 119/19 |
| 3,884,188 | 5/1975 | Arends | 119/28 X |
| 3,895,606 | 7/1975 | Galloway | 119/16 |
| 4,235,197 | 11/1980 | Curtis et al. | 119/28 |
| 4,258,662 | 3/1981 | Schafer | 119/28 |
| 4,332,214 | 6/1982 | Cunningham | 119/19 X |
| 4,348,987 | 9/1982 | Herring | 119/28 X |
| 4,356,792 | 11/1982 | Leverett | 119/28 |
| 4,372,251 | 2/1983 | Keith | 119/16 |
| 4,393,812 | 7/1983 | Ahrens | 119/16 |
| 4,696,259 | 9/1987 | Fewox | 119/19 |
| 4,945,858 | 8/1990 | Myers et al. | 119/28 |
| 4,998,506 | 3/1991 | Frostad | 119/17 |

*Primary Examiner*—Gene Mancene
*Assistant Examiner*—Thomas Price
*Attorney, Agent, or Firm*—Michael A. Mann

[57] ABSTRACT

An apparatus for use in the housing of dogs includes a molded fiberglass flooring, fencing and a top. Alternatively, the flooring can be comprised of sections with flanged ends for facilitating the bolting together of the sections to form the flooring surface. The apparatus is movable and sanitary, and is modular for side-by-side kennels. The composite flooring has a rim to prevent waste from splashing from one kennel to an adjacent one, and a trough outside the fencing with a drain for flushing animal wastes into a sewage system. The top layers of the flooring is textured fiberglass, providing the animal with a non-abrasive, non-slip surface, that is easy to clean, stain-resistant, non-porous, waterproof and rigid. The flooring is formed in three layers, two layers oil fiberglass with a layer of light wood or foamed plastic therebetween.

18 Claims, 4 Drawing Sheets

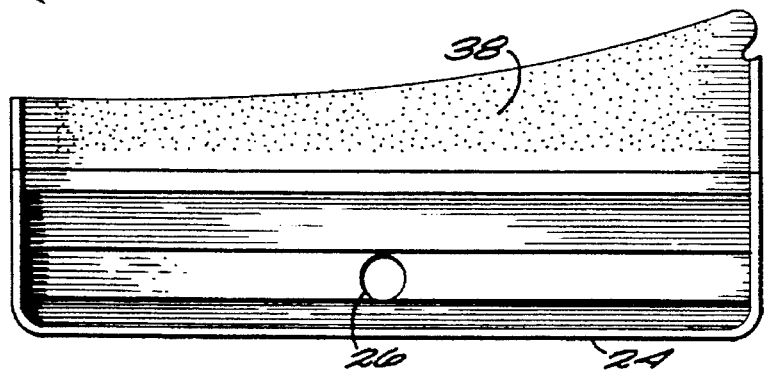
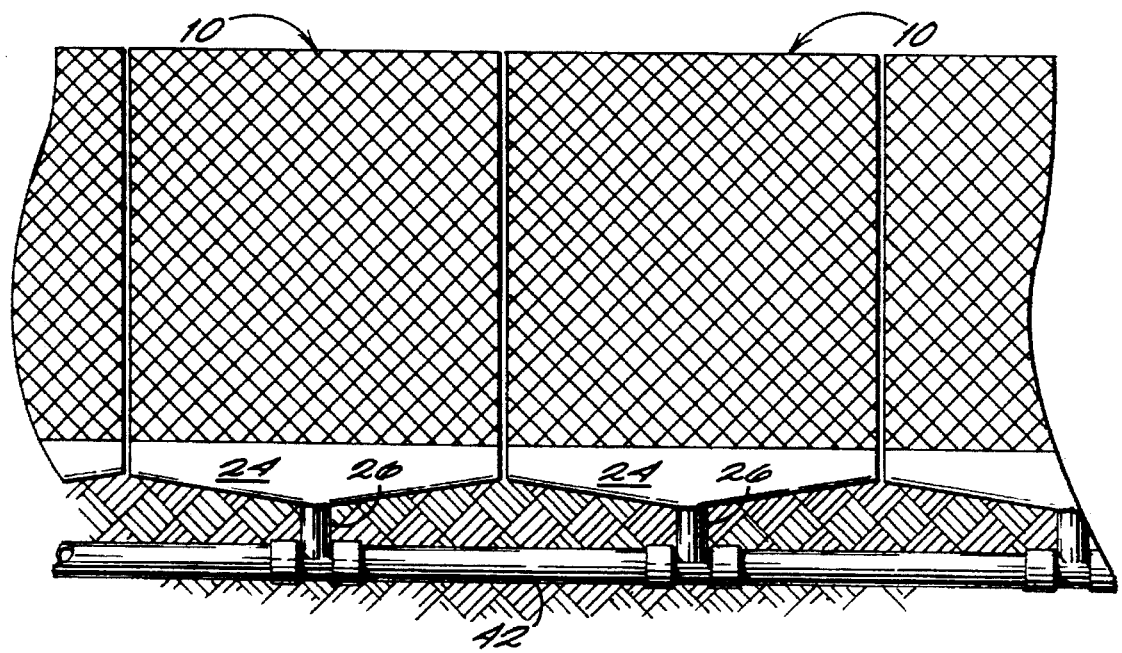

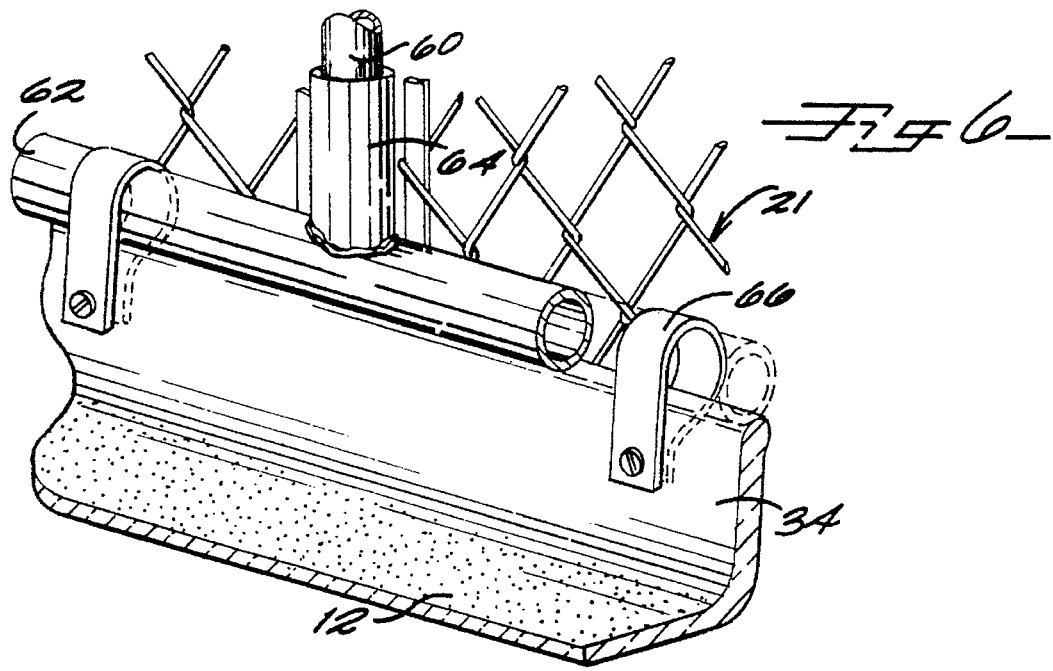
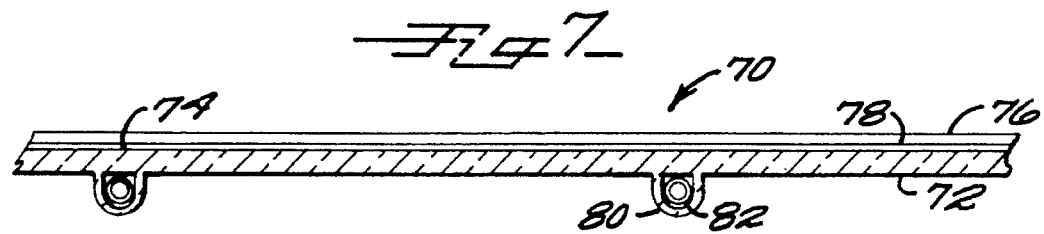
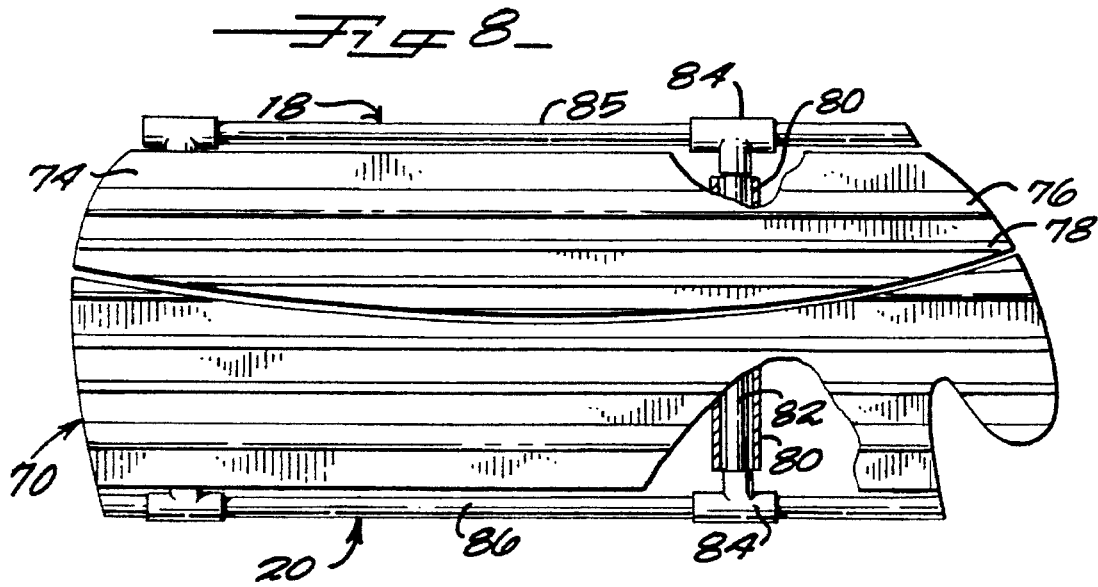

SANITARY DOG KENNEL

This application is a continuation-in-part of Ser. No.: 08/079,017 filed on Jun. 18, 1993 now U.S. Pat. No. 5,335,617.

BACKGROUND OF THE INVENTION

1. Field of the Invention

The present invention relates to a device for housing a dog. More specifically, the invention relates to a dog kennel comprising a sanitary surface, fencing and a top secured to the fencing that forms a shelter for the animal.

2. Discussion of Background

Many devices exist for housing dogs. Most of these are in the form of kennels for one or more dogs that employ the use of concrete as the foundation, while the sides are formed by chain link fencing. There are two problems associated with such kennels: the surface cannot be adequately cleaned and it is immobile.

Once the concrete foundation is laid, it becomes a permanent structure and thereafter is impossible for the dog owner to transport the kennel to a new location. Furthermore, if the kennel is no longer required, and the side fencing is disassembled, there remains the concrete base. This concrete foundation is a visual nuisance and often devalues the land on which it is situated, and therefore, destruction of the concrete foundation is usually required. Removal of the concrete foundation, including breaking it up, loading it and disposing of it, is neither easy nor inexpensive.

Because they are not easily cleaned, concrete foundations contribute to a variety of sanitary problems that Confront a dog owner. To provide for the removal of waste generated by the dog, many kennels are equipped with a drain located within the enclosed area. When a concrete foundation is laid, it is sloped at an angle such that when the waste is to be removed, the interior of the kennel can be hosed With water to drive the waste to the drain. However, it is rare that the actual foundation is engineered; rather, it is simply laid out with a simple wood form and the concrete poured. As a result, when the concrete sets, it often contains surface irregularities or "pockets" which can trap the waste water in puddles and thereby provide standing water for bacteria carrying disease to live. Specifically, this problem often results in kennel dogs contracting Giardia, a contagious parasitic disease which thrives in standing water.

Furthermore, concrete is a porous material and is susceptible to cracking as it cures and settles, both conditions provide a refuge for germs and disease. The porous, brittle nature of concrete foundations contributes to unclean kennel conditions. When dogs are housed in adjacent kennels, these conditions frequently lead to serious, easily-spread and sometimes fatal canine diseases such as tapeworms, Parvo and Giardia. Therefore, there is a need for a kennel foundation that can be cleaned easily and thoroughly.

Concrete foundations also detract from the appearance of a kennel because stains caused by animal defecation and urination cannot be removed. Additionally, concrete causes fur loss at areas that repeatedly contact the concrete, such as elbows, thereby diminishing the appearance of the animal, especially show dogs.

Many designs for kennels employ a waste drain inside the kennel. These drains usually leave a surface residue of both liquid and solid waste. By placing the drain within the kennel, the animal has an opportunity to tamper with its waste, or the waste of the animal previously in the kennel, and thereby increase its exposure to contagious diseases. When a kennel floor is washed with a hose, feces from one pen can be splattered into an adjacent pen, further contributing to the spread of disease. The significance of this biologically hazardous exposure, and the potential for exposure of multiple animals, is especially important when considering a kennel that houses many animals over a period of time, such as a veterinarian's kennel. It is well known that animals kept at a veterinary hospital are more susceptible to contracting disease, due to kennel conditions and the proximity of animals to each other.

Given these conditions, there exists a demand for a kennel that employs a mobile, easily-installed, easily-cleaned and non-abrasive foundation with a waste drain that is beyond the animal's reach.

SUMMARY OF THE INVENTION

According to its major aspects and briefly described, the present invention is an apparatus for use in housing dogs. The apparatus comprises a molded composite flooring, fencing that is secured to the flooring, and a top that covers the fencing. The flooring has two sides and a first and second end. Both sides and the first end have a rim, and the first end also has a trough with a drain for receiving and conducting animal waste away. The fencing extends along the sides and across both ends of the flooring. There is a door included in the fencing at the second end, away from the second end of the flooring. The fencing extending from the first end is spaced a distance from the trough so that the trough and drain are outside the area of the flooring enclosed by the fencing. The fencing has vertical support posts that rest on the rim of the flooring and horizontal posts that connect the vertical posts. There is a molded fiberglass top that covers the fenced portion of the flooring.

Alternatively, the flooring can be manufactured in sections, such sections having two sides, a first and second end. Both sides are rimmed, and the first and second end; are flanged and drilled through so that adjacent sections can be bolted together. The flooring sections are composed of a top and bottom layer of fiberglass or other similar impervious, stain resistant material. Between them is a middle layer of wood or foam that provides rigidity while minimizing its addition of weight to the section. In this embodiment, the trough with drain section is secured to a flooring section using nut-and-bolt combinations to join the flanges of the adjacent sections.

The fencing, flooring, whether in one piece or composed of bolted sections, and top allow the kennel to be used in a modular fashion, in side-by-side relationship with other similar flooring with fencing shared by adjacent kennels, the support posts of the shared fencing resting on the rims of the adjacent flooring units. The top is reinforced with ribs molded into it; the top of the flooring is textured to provide traction and both flooring and top are coated with a vinyl paint such as GELCOAT™ to provide smooth, aesthetically pleasing and matching finishes.

A major feature of the present invention is the prefabricated flooring that obviates a need for special installation. The present kennel is therefore easy to install and easy to move to a new location. The flooring may be laid on sand, gravel or earth, or placed on blocks to keep it off the ground; no permanent structure need be put in place and no heavy equipment used. If a dog owner moves, the kennel can be moved, too.

Another very important feature of the present invention is the use of fiberglass as a flooring material. Fiberglass is non-porous, waterproof and stain-resistant, and therefore it is easy to clean, will not support bacteria or viruses, and it will maintain its appearance. It can also be molded at a factory, and inspected there so that there are no cracks, flaws, or puddle-forming depressions in the surface is delivered that might harbor bacteria. Also, the flooring and top can be made in a variety of colors. Preferably, the flooring and top will be made of a light color for two reasons. First, a light color reflects light and will prevent the kennel from becoming as hot as a dark colored flooring. Second, a light colored floor will allow the owner to detect blood that might indicate the animal is in heat or ill. The top of the fiberglass flooring is textured so that the dog may have a tractioned surface to walk on, yet fiberglass is non-abrasive and will not irritate the dog as concrete will.

Another feature of the present invention is the middle layer of the flooring sections. A middle layer of either wood or foamed plastic provides adequate structural rigidity while minimizing weight. Consequently, the flooring sections can be transported and a kennel assembled quickly with a minimum of effort.

Still another feature of the present invention relates to its sanitary nature with the molded trough, drain and rim. The trough and drain are positioned outside the fenced area. As a result, the waste residue in both the trough and the drain cannot be reached by the dog once it is washed out of the fenced area. Because the drain is outside the fenced area, it need not be covered with a grid to protect the animal and can be dimensioned so that fetal material is easily washed down. This feature will reduce an animal's exposure to contagious canine diseases that are often contracted through contact with animal wastes. Similarly, the rimmed sides of the foundation provide further protection for the animal. The rimmed sides act as "splash guards" and limit the possibility of waste from one kennel from entering an adjacent kennel and to help to channel the waste to the drain rather than over the edges of the flooring.

Yet another feature of the present invention is the modular nature of construction. The flooring is dimensioned to house one animal but any number of floorings can be placed in adjacent relationship to house as many animals as desired. The width of the flooring is dimensioned in particular so that the side fencing can be shared by adjacent pens. If, however, it is preferred that the animals in adjacent pens not be able to touch noses and paws, the side fencing posts can be rotated to fit inside the rims where the individual, separated fencing of adjacent pens will prevent animal-to-animal contact.

An additional feature of the present invention is the molded, reinforced fiberglass top. The top is secured to the kennel fencing to prevent it from separating from the kennel during a storm and further protects the animal from inclement weather, predators, other dogs and thieves.

Other features and advantages will be apparent to those skilled in the art of keeping dogs from a careful reading of the Detailed Description of Preferred Embodiments, accompanied by the drawings.

BRIEF DESCRIPTION OF THE DRAWINGS

In the drawings,

FIG. 4. is a detailed top view of the present invention illustrating the trough and drain;

FIG. 5. is a front view showing the present invention used in a modular fashion;

FIG. 6 is a detailed perspective view of the attachment of the fencing to the flooring according to a preferred embodiment of the present invention;

FIG. 7 is a side, cross-sectional view of the top of the kennel according to a preferred embodiment of the present invention; and FIG. 8 is a top view, partially cut away of the top of the kennel.

DETAILED DESCRIPTION OF A PREFERRED EMBODIMENT

Figure 1:
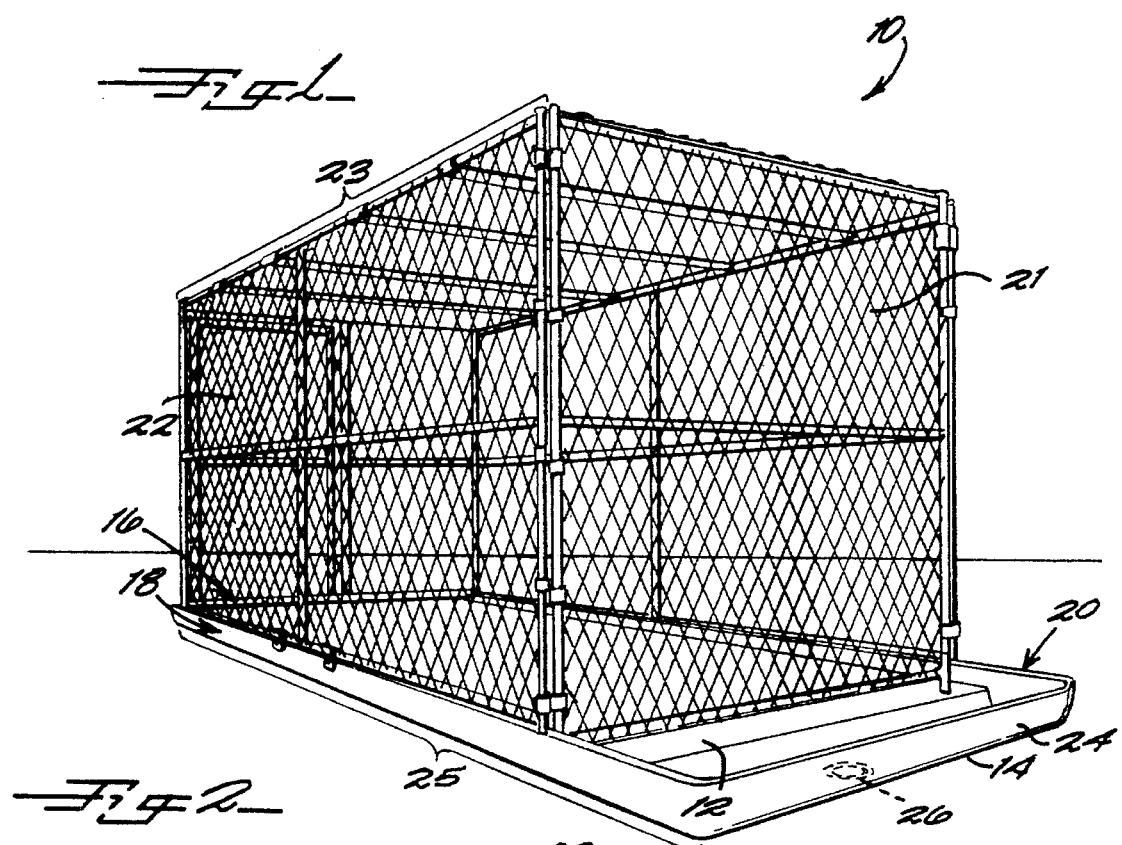
FIG. 1. is a perspective view of a kennel according to a preferred embodiment of the present invention.

The present invention is an apparatus for use in housing dogs. FIG. 1 shows the apparatus in perspective and generally indicated by reference numeral 10. In a preferred embodiment, apparatus 10 comprises a molded fiberglass flooring 12, having a front end 14, a rear end 16, and sides 18 and 20. Apparatus 10 further comprises a top 70 (best seen in FIGS. 7 and 8), and fencing 21 which extends from both sides 18 and 20 and ends 14 and 16. Fencing 21 located at rear end 16 contains a door 22. Molded fiberglass flooring 12 further comprises a trough 24 with a drain 26 at front end 14. Fiberglass flooring 12 can be manufactured for use with any standard size kennel fencing.

Figure 2:
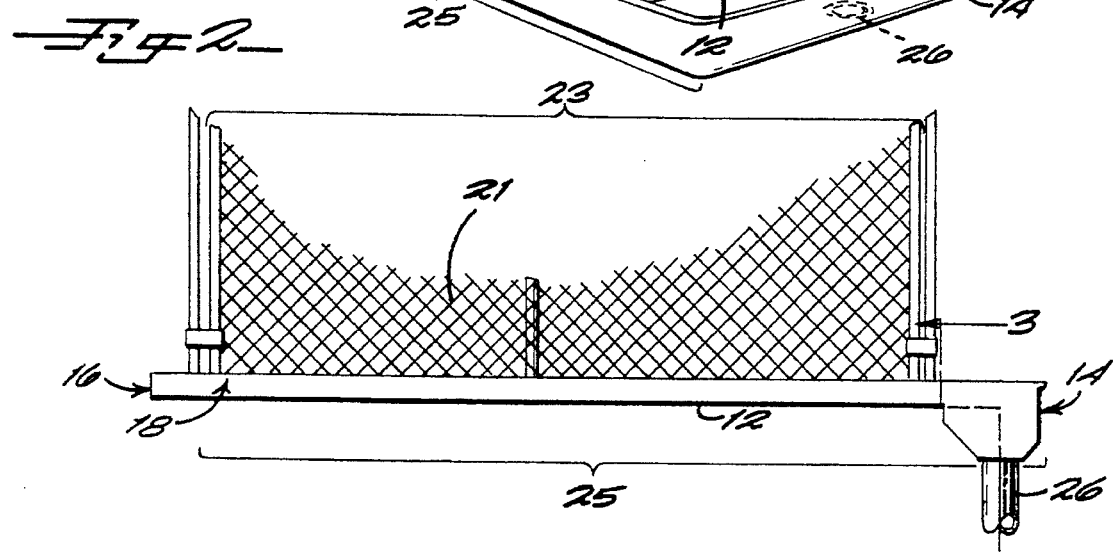
FIG. 2. is a side view of a kennel according to a preferred embodiment of the present invention.

As seen in FIG. 1 and 2, the distance 23, representing the length of fencing 21 between front end 14 and rear end 16, is less than distance 25, representing the length of fiberglass flooring 12. Therefore, trough 24 and drain 26 are located beyond fencing 21 at front end 14. As a result, exposure to disease will be minimized because the dog is housed within fencing 21 and will be unable to tamper with any waste residue remaining in trough 24 and drain 26.

Figure 3:
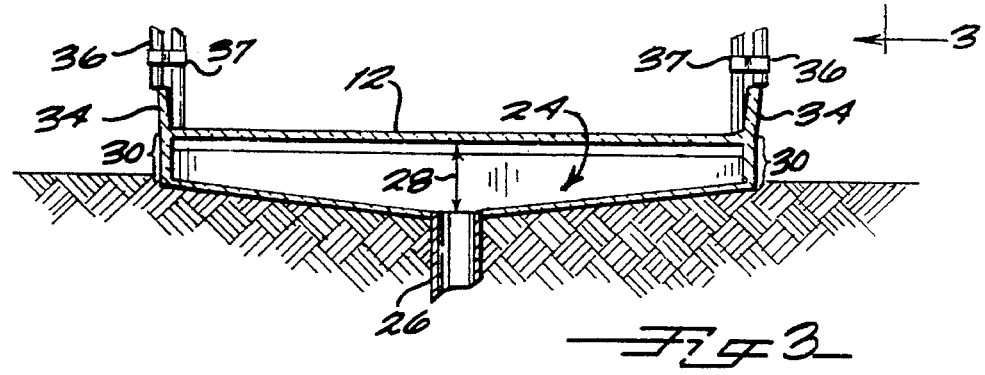
FIG. 3. is a detailed cross-sectional view taken along line 3—3 of FIG. 2.

Drain 26 is located in the center of trough 24, as shown in FIG. 3. Also, trough 24 is molded such that distance 28 is greater than distance 30, thereby facilitating the evacuation of waste from trough 24 through drain 26. Preferably, the distance from the top surface of flooring 12 to the top of drain 26 is at least 12 inches.

In addition to trough 24 and drain 26, flooring 12 is molded with rimmed sides 34. Rimmed sides 34 extend along both sides and around first end 14 to include trough 24, but not second end 16 so as not to interfere with door 22. Rimmed sides 34, preferably at least four inches high, have two functions: they act as splash guards so that waste from one kennel cannot be transferred to an adjacent kennel; and rimmed sides 34 act as means of stabilizing support bars 36. In the preferred embodiment, support bars 36 rest on both rimmed sides 34 and the rimmed sides of an adjacent module, thereby allowing fencing 21 extending from sides 18 and 20 to act as the side fencing for an adjacent module. Alternatively, hinges 37 can be used to rotate support bars 36 so that support bars 36 are fully stabilized by rimmed sides 34 of one apparatus 10.

Referring now to FIG. 4, which shows a top view of flooring 12 with trough 24 and drain 26. Preferably flooring 12 is made of fiberglass coated with an easily-cured, polymeric paint such as GELCOAT™. However, any moldable, non-toxic, non-porous, non-abrasive, stain-resistant, rigid, waterproof material can be used, such as polyethylene. These material characteristics are necessary to assure a surface that does not trap waste, is easy to clean, and maintains the appearance of the animal. The surface of flooring 12 is textured 38, to provide traction for the animal, which make the apparatus easier to clean. Although flooring 12 can be manufactured in any color, the preferred embodiment is a light color for two reasons: a light color will prevent the kennel from becoming unnecessarily hot and will increase the visibility of discharges that may indicate the animal is in heat or ill.

According to the preferred embodiment, FIG. 5 shows apparatus 10 employed in a modular fashion, wherein each apparatus 10 is placed adjacent to another apparatus 10. When apparatus 10 is employed as a modular unit with others, drain 26 of each apparatus 10 is connected to pipe system 42, thereby minimizing the piping necessary to clean a series of kennels. As best seen in FIG. 3, support bars 36 in conjunction with rimmed sides 34 provide a distance between adjacent apparatus 10, thus preventing physical contact between dogs housed in adjacent apparatus 10.

FIG. 6 shows the securing means by which fencing 21 is secured to flooring 12. Vertical side fence post 60 is connected by welding to horizontal side fence post 64. Flooring 12 is fastened to fencing 21 by a plurality of J-hooks 66 bolted or screwed into rimmed sides 34. J-hooks 66 wrap completely around side fence piping 62 to secure fencing 21 to flooring 12.

FIGS. 7 and 8 show top 70 having a bottom surface 72 and a top surface 74. Top surface 74 of top 70 is coated with GELCOAT™ and contains a plurality of larger ribs 76 spaced 9¾" inches apart with two smaller ribs 78 spaced 2¼" apart between every two larger ribs. Larger ribs 76 and smaller ribs 78 provide rigidity for top 70.

The bottom surface 72 of top 70 employs a plurality of hollow tubes 80 perpendicular to sides 18 and 20 (FIG. 8). Tubes 80 are designed to accept top fence piping 82. As best shown in FIG. 8, top 70 is stabilized by top fence piping 82 contained within tubes 80. Top 70 is secured to fencing 21, by a plurality of T-clamps 84 that connect top fence piping 82 to side fence piping 86 located at top of fencing 21 on sides 18 and 20. When kennels are placed side by side and share a common wall, a top 70 of one kennel will be rotated 180° with respect to a next top 70 so that tubes 80 of one are not aligned with tubes 80 of the adjacent top 70. Therefore, the T-clamps 84 securing piping 82 of adjacent kennels to fencing 21 will not interfere.

Figure 9:
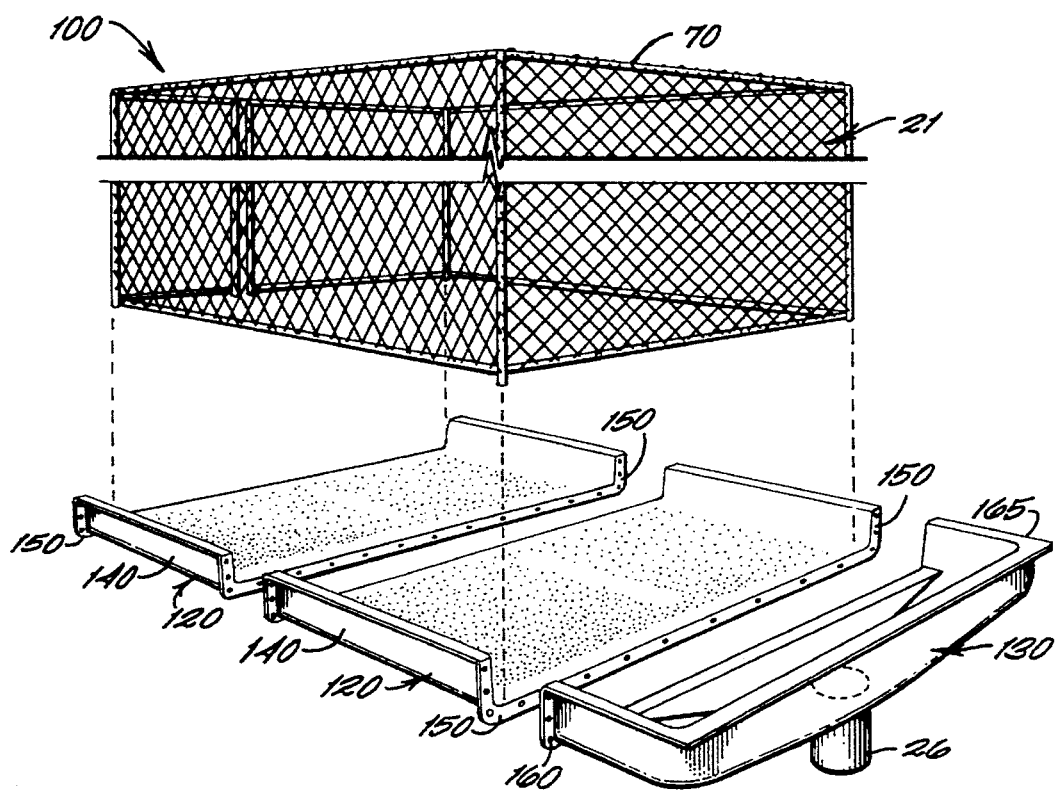
FIG. 9 is a perspective view, partially cut away, of a kennel according to an alternative preferred embodiment of the present invention.
Figure 10:
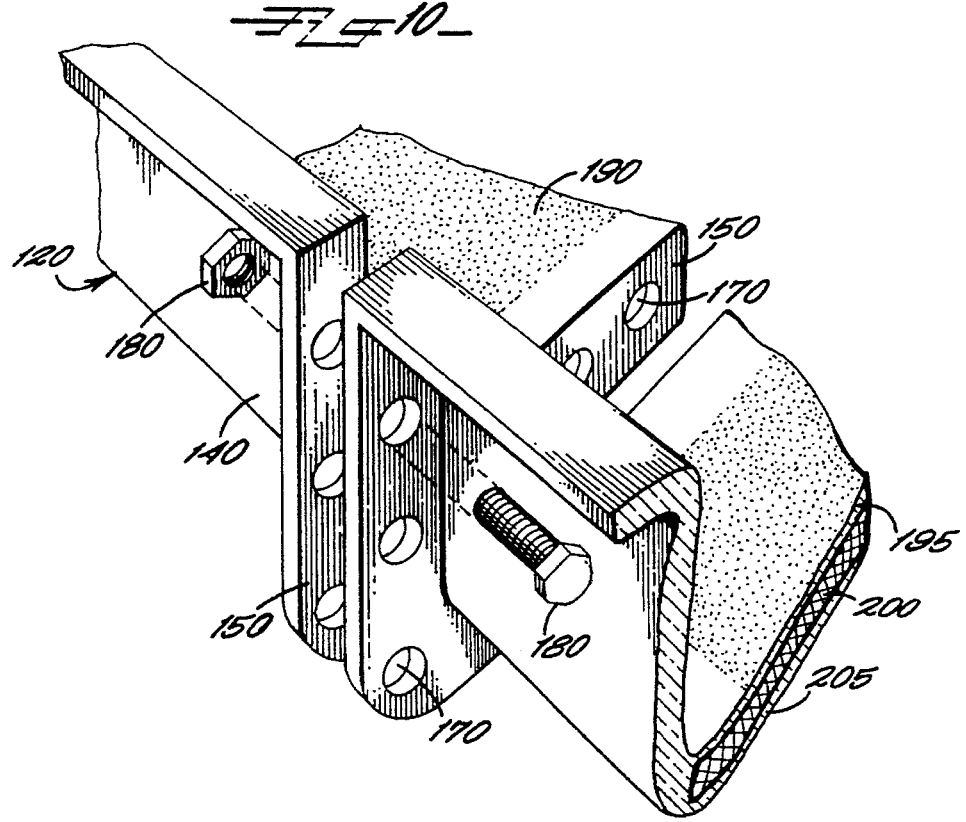
FIG. 10 is a detailed perspective view of the ends of the flooring sections according to an alternative preferred embodiment.

FIG. 9 shows an alternative embodiment of the present invention in perspective and generally indicated by reference numeral 100. In this preferred embodiment, apparatus 100 comprises a top 70, fencing 21, a plurality of flooring sections 120, and trough 130 with a centrally located drain 26. Each flooring section 120 has rimmed sides 140 and flanged ends 150 (Best seen in FIG. 10.). Trough 130 has a flanged end 160 and rimmed end 165. Flanged ends 150 of flooring section 120 and flanged end 160 of trough 130 contain annular holes 170 fitted to accept nut and bolt assemblies 180.

The horizontal component 190 of flooring section 120 is composite and consists of top layer 195, middle layer 200 and bottom layer 205. Preferably, both top and bottom layer, 195 and 205 are made of fiberglass coated with GELCOAT™, or similar moldable, non-toxic, non-porous, non-abrasive, stain-resistant, rigid, waterproof material, thereby providing a surface where sanitary conditions are easily and effectively maintained. Additionally, top layer 195 is textured, thereby providing a tractioned surface for the animal to walk on. Middle layer 200 is composed of wood or a foam product and gives flooring section 120 strength and rigidity while minimizing weight.

Apparatus 100 is assembled by bolting flanged ends 150 of flooring sections 120 to an adjoining flange end 150 until the desired length of contiguous flooring is obtained. Trough section 130 is affixed to apparatus 100 by bolting ranged end 160 to ranged end 150 of flooring section 120.

In use, a place can be prepared for receiving the flooring of apparatus 10 or 100 by simply raking the soil and placing the respective flooring directly on the soil. Preferably, however, sand or pea gravel can be deposited on the soil so as to provide a surface that will conform to the bottom surface of the flooring. Alternatively, where it is desirable to elevate the flooring above the soil, it can be placed on blocks or a temporary platform as required. It is important that the end opposite the trough 24 and drain 26 of apparatus 10 (or trough section 130 of apparatus 100) be elevated slightly so that water and urine will run toward to trough 24 (trough section 130).

When several animals are to be housed in adjacent pens, flooring 12 (sections 120) should be oriented so that all troughs 24 (sections 130) are on the same sides and flooring 12 (sections 120) is in side-by-side relationship. Drains 26 of troughs 24 (sections 130) should then be connected by a pipe system 42 to a septic field or sewage system.

Flooring is preferably molded to receive standard kennel fencing 21, such as 6'×12', 10'×10', or 8'×8'. If more than one dog is to be housed in adjacent pens of a kennel, fencing 21 on either side can be shared or each pen can have its own to space the animals out of contact range.

The kennel should be flushed with water from a hose frequently, working the hose from side to side, rim to rim and from the door end of the fencing to the trough. Finally, the trough should be hosed clean, driving with the water all wastes into the drain. Note that rim 20 (165) runs all around trough 24 (section 130), including its ends, so that flooring 12 (sections 120) can be used by itself or with other modular units.

It will be apparent to those skilled in the art that many modifications and substitutions can be made to the preferred embodiment just described without parting from the spirit and scope of the invention as defined by the appended claims.

What is claimed is:

1. A flooring for use in a dog kennel, said flooring comprising a plurality of flooring sections and a trough component, said plurality of flooring sections and trough component are joined together to form said flooring, each of said flooring sections defining a first end and an opposing second end, a first side and an opposing second side, said plurality of sections defining a rim extending along each of said first side and each of said second side, each of said sections having flanged ends projecting perpendicular to each said rim, said plurality of sections having a horizontal component including a top layer, a middle layer and a bottom layer, said trough component having a first end and opposing second end, opposing sides, a rim extending along said opposing sides and said first end of said trough component, a flange extending along said opposing second end, and a drain between said rims of said opposing sides and said first end of said trough component, said drain dimensioned for flushing canine waste therethrough.

2. The flooring as recited in claim 1, wherein said flanges of said plurality of sections have holes formed therein to receive bolts so that adjacent sections can be bolted together.

3. The flooring as recited in claim 1, wherein said rim of said trough component is at least four inches above and said drain is at least twelve inches below said top layer of said plurality of sections.

4. The flooring as recited in claim 1, wherein said top and said bottom layer of said horizontal components are fiberglass and said middle layer is one selected from the group consisting of wood and fiber.

5. A dog kennel, comprising:
a plurality of horizontal sections in adjacent relationship and fastened together to form a surface, each section of said plurality of horizontal sections having a first side and an opposing second side, said plurality of horizontal sections, when fastened, defining for said kennel a first end and an opposing second end of said surface, a rim formed along said first and second sides of said each section, said rim of said each section joining a rim of an adjacent section to form a continuous rim along said surface;

a trough section fastened to said first end of said surface;

fencing supported by said rim of said sections and enclosing said surface, said trough section being outside said fencing.

6. The kennel as recited in claim 5, wherein said each section of said plurality of sections has a horizontal component that includes a top layer, a middle layer and a bottom layer, said top and bottom layer are fiberglass, said middle layer is made of a material selected from the group consisting of wood and foam.

7. The kennel as recited in claim 5, wherein said trough has a rim and a drain, said rim being at least four inches above and said drain at least 12 inches below said surface.

8. The kennel as recited in claim 5, wherein said fencing further comprises support posts and said plurality of sections are dimensioned so that said support posts will rest halfway on said rim on said first and said second sides of said sections.

9. The kennel as recited in claim 7, wherein said drain is centered in said trough section and said trough section is sloped toward said drain.

10. The kennel as recited in claim 7, wherein said drain is dimensioned to receive canine waste.

11. The kennel as recited in claim 6, wherein said top layer of said horizontal component is textured for traction.

12. A modular kennel for a dog, said modular kennel comprising;
a plurality of flooring sections joined together to form a surface having a first side and an opposing second side, a first end and an opposing second end, said surface having a rim formed along said first and said second sides, a trough attached to said surface at said first end and having a drain, fencing carried by said plurality of sections and extending along said first and second sides and along said first end and said second end parallel to said trough so that said trough is outside said fencing, said fencing including a door carried by said fencing along said second end; and a top supported by said fencing.

13. The modular kennel as recited in claim 12, wherein said plurality of sections each have a horizontal component, said horizontal components having a top layer, a middle layer and a bottom layer, each said top layer and said bottom layer are fiberglass, each said top layer has a textured surface, and each said middle layer is selected from the group consisting of wood and foam.

14. The modular kennel as recited in claim 12, wherein each of said sections have flanged ends having holes formed therein to receive bolts attaching said sections together to form said surface.

15. The modular kennel as recited in claim 12, wherein said trough has a first end and an opposing second end, opposing sides, a rim formed along said trough first end, a flange formed along said trough first end with holes formed therein to receive bolts fastening said trough to a flooring section, said drain centered in said trough.

16. The modular kennel as recited in claim 12, wherein said drain is at least 12 inches below said surface.

17. The modular kennel as recited in claim 12, wherein said rim is four inches above said surface.

18. The modular kennel as recited in claim 12, wherein said top is made of fiberglass and has means formed therein for reinforcing said top.

* * * * *